Figure 1:
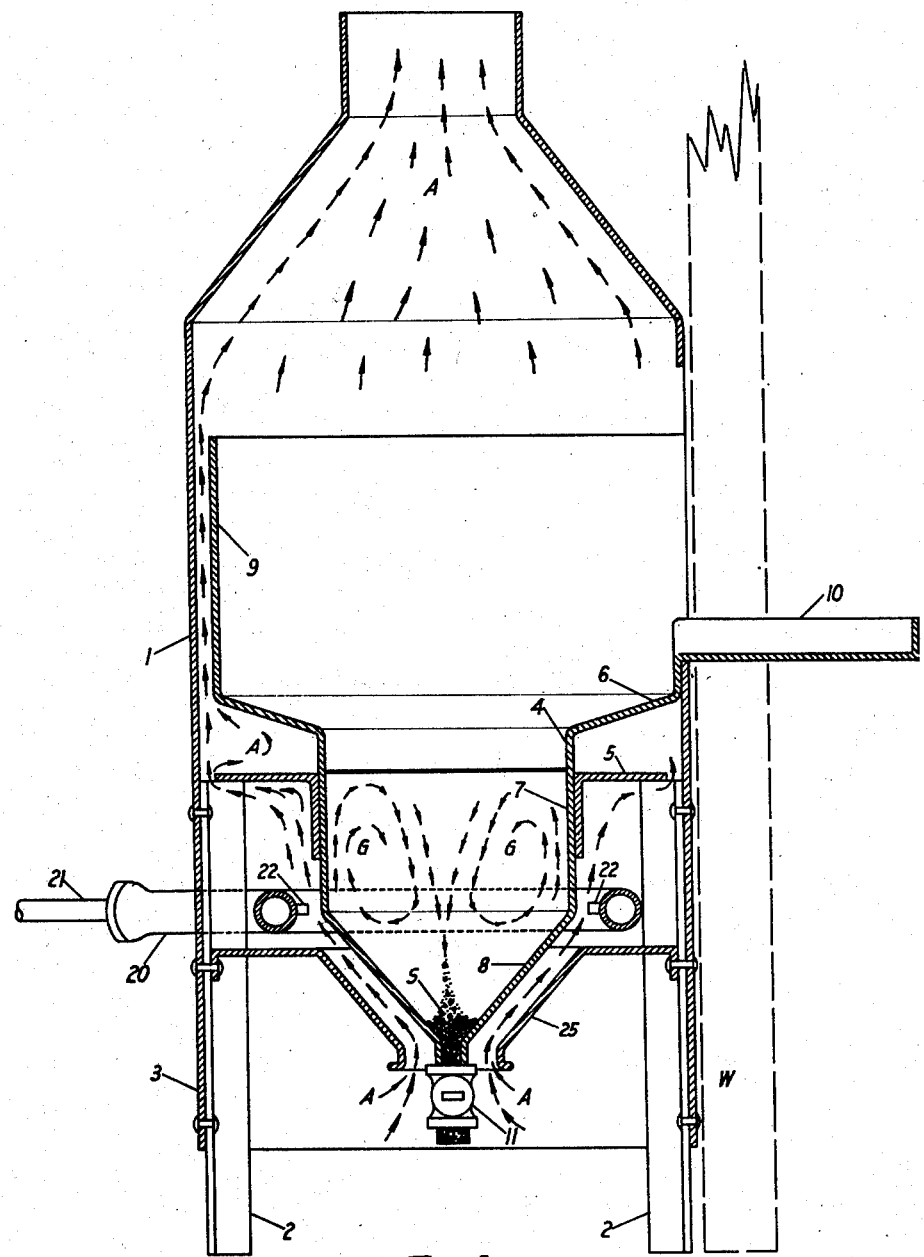

Patented Aug. 2, 1938

2,125,862

UNITED STATES PATENT OFFICE 2,125,862

DEEP GREASE FRYER

Peary F. Ratcliff, Shreveport, La.

Application July 23, 1936, Serial No. 92,173

4 Claims. (Cl. 53—7)

This invention relates to fryers generally and more specifically to deep grease fryers used in restaurants, kitchens, and the like.

The inventor of this fryer has noticed that the principal reason that cooking grease becomes disflavored so quickly is that the particles of sediment from the food being cooked burns up during the cooking operations, if not during the first cooking, during the second or third time the grease or cooking oil is used.

It is to the overcoming of this serious defect in fryers that applicant has directed his inventive faculties in the invention hereinafter detailed in the instant specification.

An important object of this invention is to provide a fryer with a sediment trap.

Another object of my invention is to provide a fryer that prevents the burning of food sediment and the resultant disflavoring of the cooking medium.

Other objects and advantages of this invention will be apparent during the course of the following description.

In the accompanying drawing forming a part of this application and in which like numerals are employed to designate like parts throughout the same, Fig. 1 is a vertical cross section of a fryer embodying the invention.

In the drawing wherein for the purposes of illustration is shown a preferred form of this invention, numeral 1 designates generally the fryer as a whole, numeral 2 designates supporting legs. The fryer is provided with an encircling hood 3 which is riveted or otherwise attached to the legs 2 a short distance above their lower ends to allow an air space. In this position the lower portion of the hood serves to shut off cross drafts while still allowing sufficient space for air to come through.

The grease container 4 has rigidly mounted on it an encircling baffle flange 5 designed to rest on the top of the supporting legs 2. The baffle flange 5 serves not only to support the grease container 4 but in addition serves to deflect hot air away from its apron 6.

The portion of the grease container 4 that holds the cooking grease G is comprised of an upper cylindrical portion 7 and a lower inverted conical portion 8.

A burner 20 is mounted around the grease container at the lower end of the upper cylindrical portion 7 and is provided with a fuel line 21 which leads to a source of fuel not shown. The burner 20 shown for purposes of illustration is a gas type burner but it is to be understood that applicant contemplates also the use of an oil burner, electrical heating means or other heating means as substitutes for the gas heating means illustrated.

The burner 20 is provided with tips 22 which are aligned so as to direct flames against the lower end of the cylindrical section 7.

An important feature of this invention is the provision of means to use the air supply to the burners to cool part of the cooking grease. To accomplish this, an inverted conical shaped shield 25 is provided with an opening at its lower end, mounted close around the inverted conical portion 8 of the grease container 4. The shield 25 is fastened in an air tight manner at its upper end to the legs 2 and the hood 3. This construction compels all of the air supply to the burner to travel between the inner surface of the shield 25 and the outer surface of the inverted conical portion 8 of the grease container 4, and in so doing to take up the heat from the grease in the lower portion 8 of the grease container 4. The clearance between the grease container 4 and shield 25 should be as small as possible, taking into consideration the necessity of a sufficient volume of air to support combustion at the burner. In small size burners of a foot or two in diameter an inch clearance space or even less will give good results.

The grease container 4 is provided with a circumferential wall 9, a continuation of the apron 6. The peripheral space formed by the wall 9 and hood 3 constitutes a chimney which functions to induce the draft of air to supply the burner 20. The neck portion of the hood 3 discharges both the burnt gas and the fumes from the grease container 4 grease G.

The grease container 4 is further provided with a drain shelf 10 for convenience and economy in draining the cooked foods before entirely removing them from the fryer. A valve 11 is mounted on the lower end of the inverted conical portion 8 of the grease container 4 for draining off sediment composed of food particles deposited during cooking operations.

In the operation of this fryer, as illustrated, gas flames are projected onto the lower end of the cylindrical portion 7 of the grease container 4 filled with cooking grease or the like. The heated grease lying near the heated surface in accord with the laws of convection rises up along the vertical side of the cylindrical portion 7. While this is happening more grease from the center of the volume flows toward the heated portion to take the place of the ascending heated grease. Thus the grease in the upper cylindrical portion 7 of the grease container 4 circulates irrespective of the grease below. As the grease below in the inverted conical shaped portion 8 is heavier than any of the heated grease above, there is little tendency for it to join in the flow of the heated grease. During a cooking operation the circulating heated grease above described picks up food particles. In the return trip of the grease these particles of sediment are carried down through the center of the upper volume of heated grease. This momentum given the particles together with the added action of gravity causes them to go down into the lower volume of unheated grease to be deposited at the bottom of the inverted conical portion 7 where they cannot burn. By keeping the sediment from burning the grease is kept in a pure unflavored state for a long time. The inventor has found that by means of his invention cooking grease in a busy restaurant could be used for a week without changing. He has found that he can fry fish one time and chicken the next in his above described fryer without either taking the taste of the other.

It is to be understood that the form of this invention herewith shown and described is to be taken as only a preferred embodiment of the same, and that various changes in shape, size and arrangement of parts may be resorted to without departing from the spirit of this invention or the scope of the subjoined claims.

Having thus described my invention I claim:

1. In a cooking device adapted to be heated with a flame, a fryer comprising a support, and a grease container mounted on the support, said grease container being provided with an apron member at its upper portion, said grease container being provided with a peripheral flange below the said apron but above the source of the flame whereby to deflect heat from the said apron.

2. In a cooking device adapted to be heated with a flame, a fryer comprising a support, and a grease container mounted on the support, said support being provided with a housing means open at its bottom and top surrounding the grease container and the source of flame, said housing terminating at its lower end in a shield surrounding the lower end of said grease container whereby to enduce a draft of air for cooling the lower portion of the said grease container in travel to the source of flame.

3. The device as claimed in claim 2 wherein the said grease container is provided with an apron at its upper end.

4. The device as claimed in claim 2 wherein the said grease container is provided with an apron at its upper end and a baffle means between the said apron and the source of flame.

PEARY F. RATCLIFF.